(12) United States Patent
Brandl et al.

(10) Patent No.: US 7,150,103 B2
(45) Date of Patent: Dec. 19, 2006

(54) METHOD FOR PRODUCING AND MOUNTING A BODY HAVING AN ANGLE SCALING

(75) Inventors: Sebastian Brandl, Altenmarkt (DE); Juergen Hertenberger, Bodenkirchen/Aich (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/240,611

(22) Filed: Sep. 29, 2005

(65) Prior Publication Data
US 2006/0065414 A1 Mar. 30, 2006

(30) Foreign Application Priority Data
Sep. 29, 2004 (DE) .................. 10 2004 047 083

(51) Int. Cl.
*G01B 11/26* (2006.01)
(52) U.S. Cl. .................... 33/1 PT; 33/1 N; 33/706
(58) Field of Classification Search ............. 33/1 PT, 33/1 N, 706–708, 762–763
See application file for complete search history.

(56) References Cited
U.S. PATENT DOCUMENTS
5,979,238 A * 11/1999 Boege et al. ............. 33/755

6,293,021 B1 9/2001 Freitag et al.
6,481,115 B1 11/2002 Henshaw et al.
6,775,921 B1 * 8/2004 Spark et al. ............. 33/706
7,032,317 B1 * 4/2006 Hertenberger et al. ....... 33/1 N
7,089,678 B1 * 8/2006 Novak et al. ............. 33/706

FOREIGN PATENT DOCUMENTS

| CH | 352 835 | 4/1961 |
|---|---|---|
| DE | 100 19 499 | 10/2001 |
| EP | 0 913 669 | 5/1999 |
| JP | 2001-227990 | 4/2001 |
| WO | WO 2004/008076 | 1/2004 |

OTHER PUBLICATIONS

Patent Abstracts of Japan vol. 2000, No. 25, Apr. 12, 2001.
European Search Report, European Patent Application No. 05 01 0106.2, dated Jan. 19, 2006.

* cited by examiner

*Primary Examiner*—Yaritza Guadalupe-McCall
(74) *Attorney, Agent, or Firm*—Kenyon & Kenyon LLP

(57) ABSTRACT

A method for producing and mounting a body having an angle scaling includes: applying three markings to the body, the markings being set apart from each other; adjusting the body relative to a support device, so that the distances between the markings and a point, which is permanent relative to the support device, are equal; applying an angle scaling to the adjusted body; dismounting the body from the support device; and mounting the body, provided with the angle scaling, on a machine part so that the distances between the markings and a point, which is permanent relative to the machine part, are equal.

16 Claims, 4 Drawing Sheets

METHOD FOR PRODUCING AND MOUNTING A BODY HAVING AN ANGLE SCALING

CROSS-REFERENCE TO RELATED APPLICATIONS

The present application claims priority to Application No. 10 2004 047 083.9, filed in the Federal Republic of Germany on Sep. 29, 2004, which is expressly incorporated herein in its entirety by reference thereto.

FIELD OF THE INVENTION

The present invention relates to a method for producing and mounting a body having an angle scaling, which may be usable, e.g., as a material measure in angle-measurement systems.

BACKGROUND INFORMATION

Such angle-measurement systems may be used for measuring rotary motions and rotational positions of a machine part, e.g., a shaft. The rotary motion is determined either incrementally or absolutely. The output measured value is, for example, a sequence of counting pulses, a counter value or a code word. Corresponding angle-measurement systems may be used in so-called pick-and-place machines in the manufacture of electronic components, or in machine tools for measuring rotary movements. The precise reproducibility or repeatability of the rotational angles of machine parts to only a few angular seconds may be very important when working with pick-and-place machines, for example. The absolute accuracy of the measuring results of an angle-measurement system may be crucial in the case of machine tools, in particular. Angle-measurement systems may be designed such that they have no individual mounting of the components rotatable relative to each other.

The precision of an angle measurement is influenced, for example, by the quality of the angle scaling, the eccentricity of the angle scaling with respect to the mounting and by the radial eccentricity of the mounting. Particularly in the case of angle-measurement systems without self-mounting, deviations may be expected because of assembly deviations which are too great.

German Published Patent Application No. 100 19 499 describes a method for producing an angle scaling for an angle-measurement system in which the eccentricity of the body onto which the angle scaling is to be applied is measured. A correction is then made depending on the measuring results, so that a corrected angle scaling is applied.

This method may be relatively costly, and subsequently, a direct mounting on a machine part whose angular position is to be determined may be virtually impossible.

PCT International Published Patent Application No. WO 2004/008076 describes a device featuring an intermediate ring for mounting a body having an angle scaling. In this device, exact mounting of the body having the angle scaling may be comparatively difficult and costly.

European Published Patent Application No. 0 913 669 describes centering methods in which, when mounting the body having the angle scaling, the body should self-center by spring elements. The precision of the centering when working with these systems is determined by the reproducibility of the spring excursions. However, depending on the material of the spring element, the exact repeatability of the spring excursions may be unfavorably influenced, for example, in response to temperature fluctuations.

The bodies having the angle scaling inevitably exhibit circularity deviations, conditioned by manufacturing. In conventional methods, these circularity deviations are frequently recorded at many test points along the outer contour of the body. Thereupon, the midpoint of the circle of least deviation squares is calculated. To apply the angle scaling, the body is aligned so that this calculated midpoint comes to rest as precisely as possible on the axis of rotation of the support device. This type of alignment and mounting may be comparatively difficult and costly. During the later mounting of the body, provided with the angle scaling, on a machine part, the specified midpoint has to be centered again in a complex operation, precisely on the axis of rotation of the machine part in question. Since, for example, due to improved scanning techniques and interpolation electronics, such angle-measurement systems in principle allow increasingly precise measurements, the installation tolerances have to be reduced in order to exhaust the potential of the angle-measurement systems. Therefore, to increase the centering accuracy, the accuracy in determining the midpoint of the circle of least deviation squares is continually increased by increasing the number of test points, which in turn, however, increases the expenditure for manufacturing and mounting.

SUMMARY

An example embodiment of the present invention may provide a method for producing and mounting a body having an angle scaling, which may permit an extremely precise fitment, accompanied by comparatively low expenditure for manufacturing and assembly.

In an example embodiment of the present invention, at least three markings are applied to, e.g., a rotationally-symmetrical body, the markings being set apart from each other in the circumferential direction of the body. The body is subsequently aligned or adjusted relative to a support device (e.g., a rotary table), so that the distances between the markings and a point, which is permanent with respect to the support device and is located on its axis of rotation, are equal. As soon as this adjustment is completed, an angle scaling may be applied to the body. Thereupon, the body may be dismounted from the support device and is completed, for example, for later shipment. The body provided with the angle scaling may be mounted on a machine part, e.g., a shaft, the rotational position of which is to be measured. For this purpose, the body is again spatially adjusted such that the distances between the markings and a point, which is permanent relative to the machine part and is located on its axis of rotation, are equal.

As already mentioned, the adjustments are made so that the distances between the markings and the corresponding points are equal. The term "equal" should be understood in connection with the accuracies as are customary in the technical field in question here. "Equal" does not mean that of necessity in the case of any given precise measurement, the specified distances must be exactly equal. Rather, tolerances, albeit extremely small, may be allowed. The normalized length difference between a first distance, starting from a first marking point, and a second distance, which starts out from a second marking point to the corresponding point may be in a range of $\pm 4 \cdot 10^{-4}$. To be understood by the term normalized length difference is the difference between two distances in relation to one of the distances. The corresponding, normalized length differences may also be reduced, with justifiable expenditure, to the range $\pm 2 \cdot 10^{-5}$, or even to $\pm 0.5 \cdot 10^{-5}$.

When the method hereof is concluded, the body having the angle scaling is precisely mounted so that the fitment meets the condition for an angle measurement of high quality.

In practice, it may not be possible to produce the body, on which the angle scaling is to be applied, so that it is exactly round. Incidentally, the term definitions with respect to the circularity deviations correspond here to the DIN ISO 4291 of September 1987. When using the method hereof, it may not be necessary to pay attention to the circularity deviation of the body during the installation, i.e., during the mounting. For example, it may not be necessary that the midpoint of the circle of least deviation squares be ascertained. A mounting that is sufficiently exact by far for the measuring purpose may be possible even if the axis of rotation of the machine part to be measured does not intersect the midpoint of the circle of least deviation squares, or does not come to rest in immediate proximity thereto.

The markings and/or the angle scaling may be applied with the aid of an ablation process, e.g., laser ablation. As an alternative thereto, a lithography method may also be used in this connection.

In an example embodiment of the present invention, the markings and/or the angle scaling are applied outside on a lateral side of a cylindrical, e.g., a hollow-cylindrical or ring-shaped body.

The method of an example embodiment of the present invention may be usable with success both in the case of massive and for relatively slimline annular bodies, because not only is the mounting thereby facilitated, but a more precise adjustment is also carried out. The body may be implemented as a comparatively slimline annular body. Because conditioned by manufacture, such annular bodies may exhibit a significant circularity deviation due to their flexural softness. The method of an example embodiment of the present invention may be used in connection with annular bodies for which the ratio of outside diameter to inside diameter is less than 5, e.g., less than 3, e.g., less than 2.

Despite relatively large permissible deviations from an ideal geometry, which the method of an example embodiment of the present invention may be able to master, the bodies may not have an arbitrarily great circularity deviation. In an example embodiment, the circularity deviation $\Delta Zq$ (in accordance with DIN ISO 4291 indicated above) in the region of the angle scaling of the body is below 100 μm, e.g., below 50 μm.

It should be understood that the method hereof is not restricted to bodies which are cylindrical or ring-shaped. For example, the body may also take the form of a ring segment when the rotational position of a machine part does not have to be measured over a full revolution of the machine part, for example.

An example embodiment of the present invention may provide that installation may be considerably simplified for the user of such an angle measuring device, so that the respective user may not have to possess complex installation equipment, for example.

According to an example embodiment of the present invention, a method for producing and mounting a body having an angle scaling includes: applying at least three markings on the body, the markings set apart from each other in a circumferential direction of the body; adjusting the body relative to a support device so that distances between the markings and a point, which is permanent relative to the support device and which is located on an axis of rotation of the support device, are equal; applying an angle scaling to the body after the adjusting step; after the angle scaling applying step, dismounting the body, provided with the angle scaling, from the support device; and mounting the body, provided with the angle scaling, on a machine part so that distances between the markings and a point, which is permanent relative to the machine part and which is located on an axis of rotation of the machine part, are equal.

The angle scaling may be applied in the angle scaling applying step by an ablation process, e.g., a laser ablation process.

The markings may be applied in the markings applying step by an ablation process, e.g., a laser ablation process.

The method may include coating the body at least in a region of the angle scaling after the angle scaling applying step.

The method may include coating the body at least in a region of the markings after the markings applying step.

The method may include coating the body with an ablation layer at least in a region of the markings after the markings applying step.

The markings may include three markings arranged offset from each other by 120° in the circumferential direction of the body.

The body may have a ring shape.

A ratio of an outside diameter of the body to an inside diameter of the body may be less than 5.

The angle scaling may be applied in the angle scaling applying step on a lateral side of the body.

The body may have a circularity deviation in a region of the angle scaling less than 100 μm, e.g., less than 50 μm.

The angle scaling may be applied in the angle scaling applying step by lithography.

The markings may be applied in the markings applying step by lithography.

Further aspects and features hereof are explained in more detail in the following description with reference to the appended Figures.

DETAILED DESCRIPTION

Figure 1:
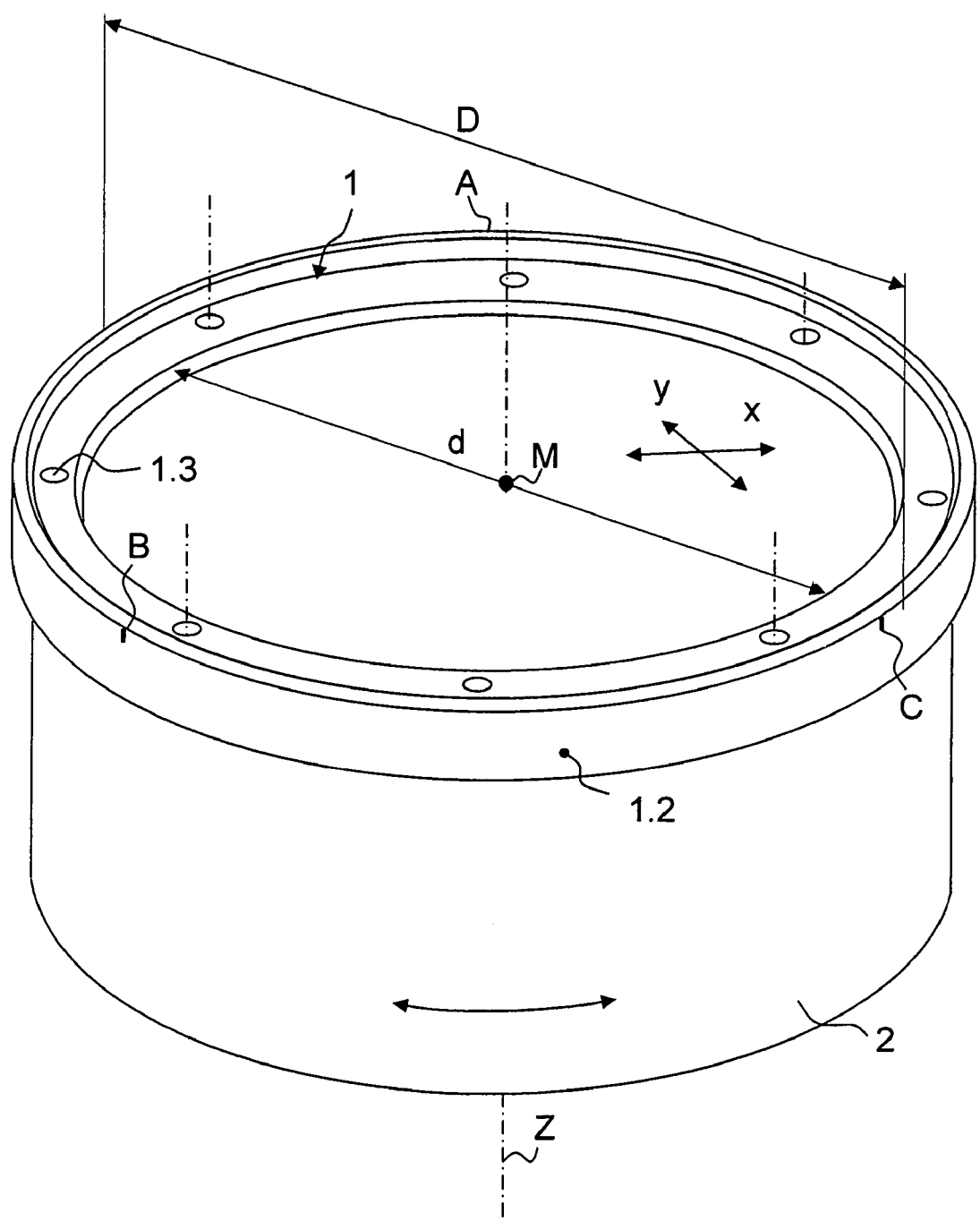
FIG. 1 is a perspective view of a body on a rotary table before an angle scaling is applied to it.

In the manufacturing method hereof, first of all, a body is produced which, in the exemplary embodiment represented, is configured as annular body 1. As illustrated in FIG. 1, this annular body 1 has an outside diameter D and an inside diameter d. Outside diameter D may be 250 mm, and inside diameter d may be 220 mm. Accordingly, the ratio D/d is 250/220, thus 1.14. Annular body 1 may be produced as precisely as possible with the aid of a turning or grinding process, so that lateral side 1.2 has a circularity deviation of, e.g., $\Delta L_q = 10$ μm (in accordance with the definition in DIN ISO 4291 of September 1987). For annular bodies 1 which have a relatively large inner opening, thus a large inside diameter d, compared to outside diameter D (D/d comparatively small), the minimally producible circularity deviations may be limited, because such annular bodies 1 may be easily deformable due to their slimline type of construction. Thus, for example, interfering deformations may be caused by the clamping of such annular bodies 1 in a processing machine. On the other hand, for certain applications of angle-measurement systems, for example, for pick-and-place machines, lightweight, and therefore also slimline annular bodies 1 may be especially required, so that a suitable dynamic performance may be achievable during operation of such pick-and-place machines, for example.

Figure 2:
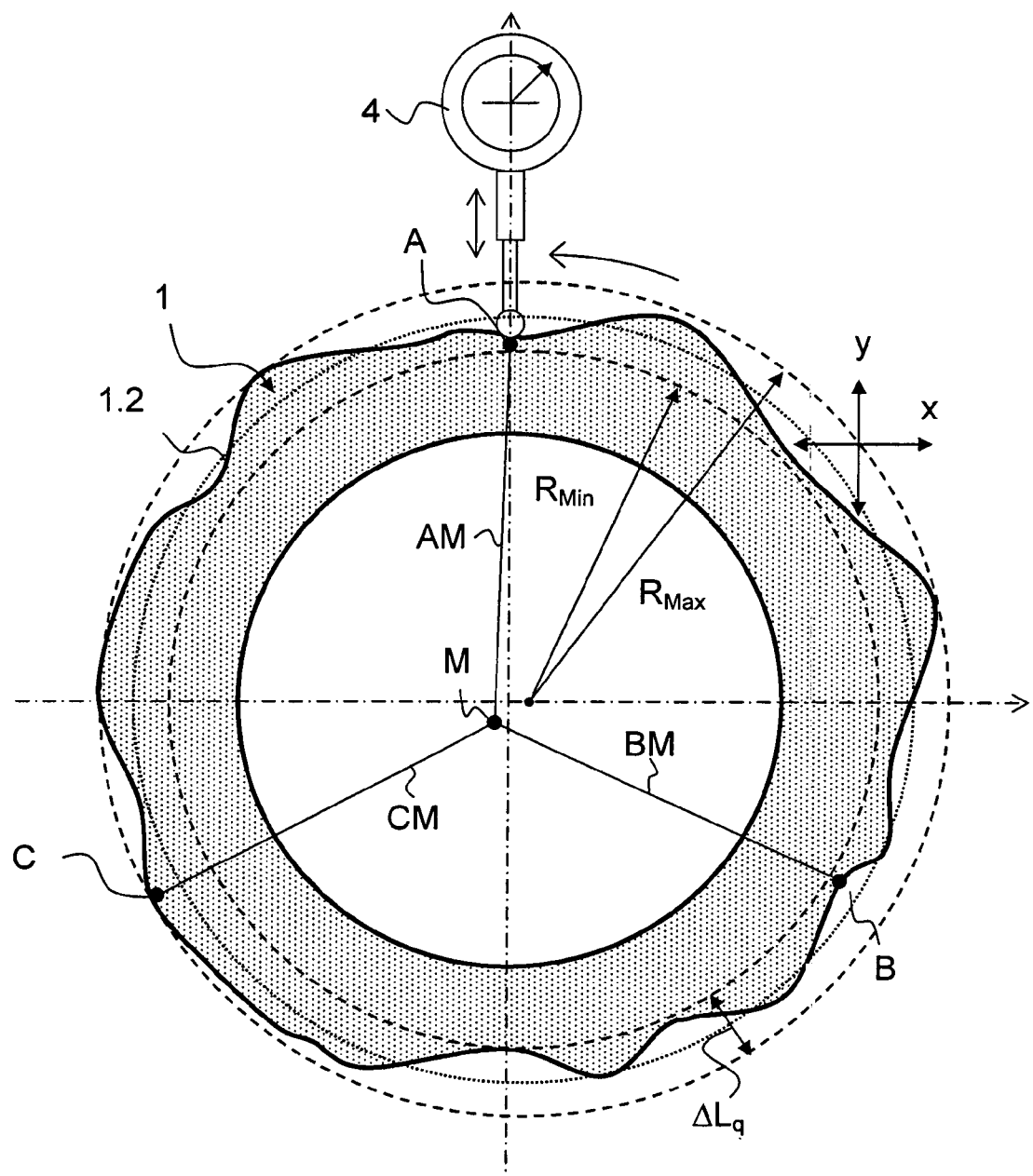
FIG. 2 is a schematic top view of the body having circularity deviations illustrated in an exaggerated manner.

FIG. 2 is a schematic top view of annular body 1, the form deviations of the outer contour of annular body 1 being illustrated in exaggerated manner, i.e., in enlarged scale. For this reason, the outer contour or lateral side 1.2 of annular body 1 appears as a wavy line. This wavy line extends over the entire periphery of annular body 1 between two concentric circular lines having the radii $R_{Max}$ and $R_{Min}$, respectively. Starting from the zero point (intersection of the two axes indicated by dot-dash lines), in accordance with the indicated DIN ISO 4291, the circularity deviations may be determined as the difference between the largest and smallest radius of the measured profile for various points on the outer contour. Consequently, the two dashed circular lines having the radii $R_{Max}$ and $R_{Min}$ envelop the extrema of the outer contour. Between these dashed circular lines is a further circular line, indicated by dots, which represents the circle of least deviation squares of the outer contour. The midpoint of the two first-named dashed circular lines—having $R_{Max}$ and $R_{Min}$—is at the same time also the midpoint of the circle of least deviation squares.

As the next manufacturing step, a thin ablation layer is applied to lateral side 1.2 of annular body 1.

In a further method step, annular body 1 produced with the circularity deviation described, is mounted on a rotatable, air-supported or air-bearing rotary table 2, which is used as a support device (FIG. 1). For that purpose, screws are turned through fastening bores 1.3 of annular body 1 into threaded holes in rotary table 2. In this context, fastening bores 1.3 have a somewhat larger inside diameter than the outside diameter of the screws. In the first step, the screws are only tightened comparatively little, so that a radially directed shift of annular body 1 in the x–y plane relative to rotary table 2 is possible. In this state, first marking A is applied to lateral side 1.2 of annular body 1 with a laser process. Air-supported rotary table 2 is then rotated by 120°, and second marking B is applied using the same process. After a further rotation by 120°, the third and last marking C is placed. Thus, the three markings A, B, C are applied to lateral side 1.2 of annular body 1 with a laser process. In so doing, markings A, B, C are set apart from each other in the circumferential direction of annular body 1. In the exemplary embodiment presented, the indicated laser process may be performed as a laser ablation process. In this process, three comparatively strong marks are removed individually as markings A, B, C from the ablation layer on lateral side 1.2 of annular body 1 with a laser beam.

In the next step, annular body 1 is adjusted with respect to rotary table 2. For this purpose, a dial gauge 4 is affixed to lateral side 1.2 in the region of marking A and in this state, is set to zero, for example (FIG. 2). Rotary table 2 is thereupon rotated by 120°, so that dial gauge 4 is in the region of marking B. The measured value is then recorded. Thereupon, after corresponding, further rotation of rotary table 2, the measured value is determined at marking C. In the course of the adjustment measures, annular body 1 is shifted in the x–y plane such that dial gauge 4 indicates the same value at all three markings A, B, C. That is, annular body 1 is adjusted relative to rotary table 2 in a manner that distances AM, BM, CM between markings A, B, C and a point M, which is permanent relative to rotary table 2, are equal. Point M then is on axis of rotation Z of rotary table 2. In this connection, point M does not have to come to be physically on rotary table 2. Here, for example, point M rests in the plane definable by the three points of markings A, B, C. As illustrated in FIG. 2, in general, point M is not the midpoint of the circle which may be determined by the least deviation squares of the outer contour, for this midpoint is that point from which the arrows for radii $R_{Max}$ and $R_{Min}$, respectively, originate in FIG. 2.

After this adjustment, annular body 1 is screwed in the adjusted position firmly onto rotary table 2. Thereupon, the application of an angle scaling 1.1 is begun directly onto coated lateral side 1.2 of annular body 1. For this purpose, the same laser process is used again as was already used for applying the marks for markings A, B, C. Thus, an individual mark ablation process is performed, in which after each graduation mark produced on annular body 1, rotary table 2 is minimally further rotated so that the next graduation mark may be applied. This process may be monitored with a highly precise angle-measurement system at rotary table 2.

When angle scaling 1.1, which is made up of the individual graduation marks, is completely applied, annular body 1 provided with angle scaling 1.1 may then be removed or dismounted from rotary table 2. Annular body 1 having angle scaling 1.1, which exists as a one-piece component, together with a device suitable for scanning angle scaling 1.1], may be delivered as a modular angle-measurement system.

Figure 3:
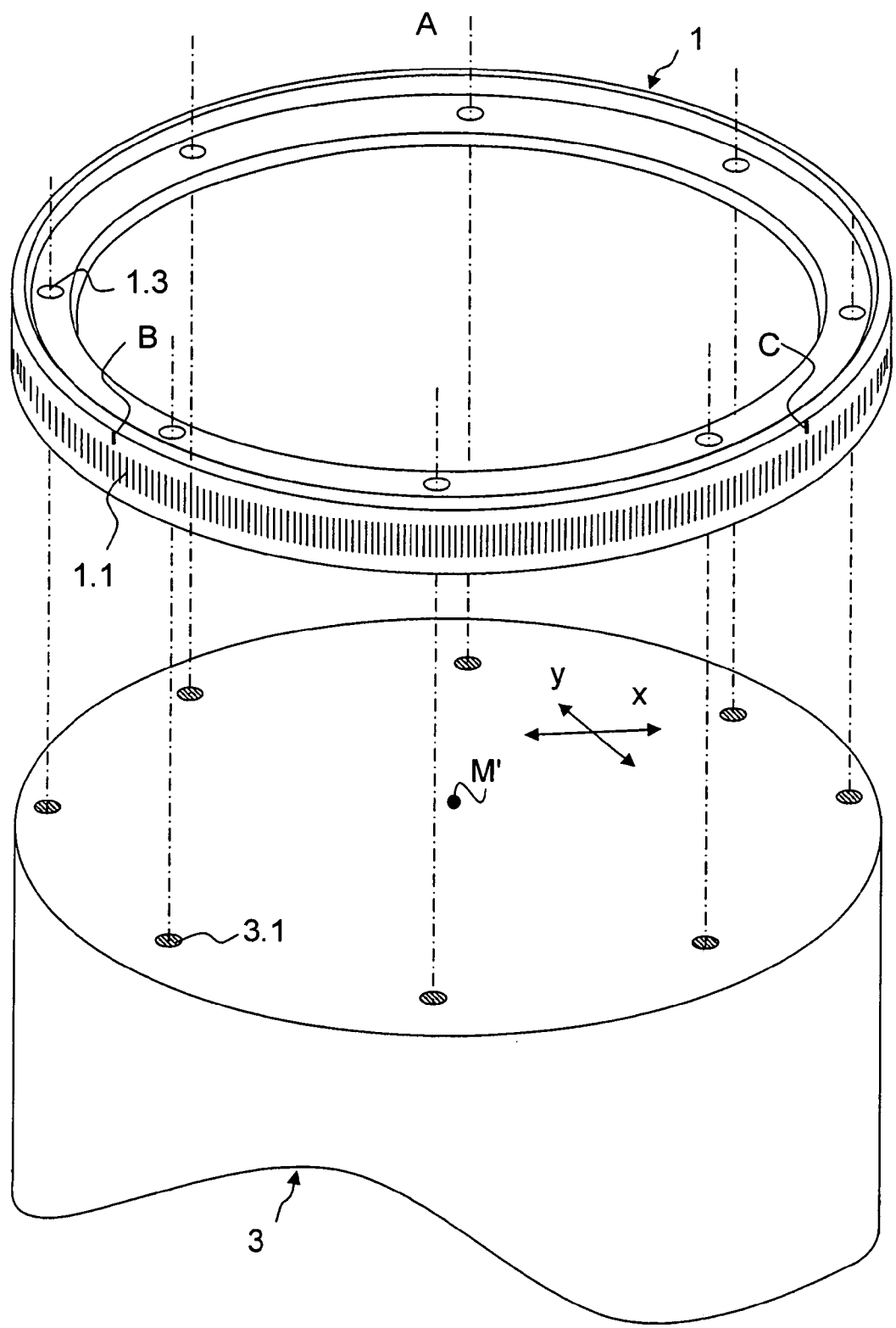
FIG. 3 is a perspective view of a body having an angle scaling before it is mounted on a machine part.

During the assembly of such a modular angle-measurement system at the user's, attention may need to be given to an exact mounting of annular body 1 on a machine part provided for it, e.g., on a shaft 3 (FIG. 3), the rotational angle of which is supposed to be measured. Going into detail, in this phase, annular body 1 provided with angle scaling 1.1 is first of all placed on shaft 3 and fixed temporarily in position using screws, which are turned in threaded holes 3.1, so that a shift of annular body 1 in the x–y plane is possible under a certain expenditure of force. Annular body 1 is then adjusted relative to shaft 3 analogously to the adjustment prior to applying angle scaling 1.1, by placing a dial gauge and rotating shaft 3 about its axis. Thus, a dial gauge is affixed to lateral side 1.2 in the region of marking A and in this state, is set to zero, for example. Shaft 3 is thereupon rotated by 120°, so that the dial gauge is in the region of marking B. The measured value is then recorded. Thereupon, after corresponding, further rotation of shaft 3, the measured value is determined at marking C. In the course of the adjustment measures, annular body 1 is now shifted in the x–y plane such that the dial gauge indicates the same value at all three markings A, B, C. That is to say, annular body 1 is adjusted relative to shaft 3 in a manner that distances AM', BM', CM' between markings A, B, C and a point M', which is permanent relative to shaft 3, are equal. Point M' then is on the axis of rotation of shaft 3.

A simple and precise mounting of annular body 1 having angle scaling 1.1 may thus be possible, the centering in the application of angle scaling 1.1 corresponding to a great extent to the state upon reading of angle scaling 1.1 of annular body 1 when it is mounted on the shaft in measuring operation. Also, in the mounted state of annular body 1 on shaft 3, in general, point M' is not the midpoint of the circle which may be determined by the least deviation squares of the outer contour. Finally, annular body 1 may be permanently fixed in position on shaft 3 by stronger tightening of the screws. Therefore, the method hereof may permit extremely simple mounting, in which high precision may be achieved.

Figure 4A:
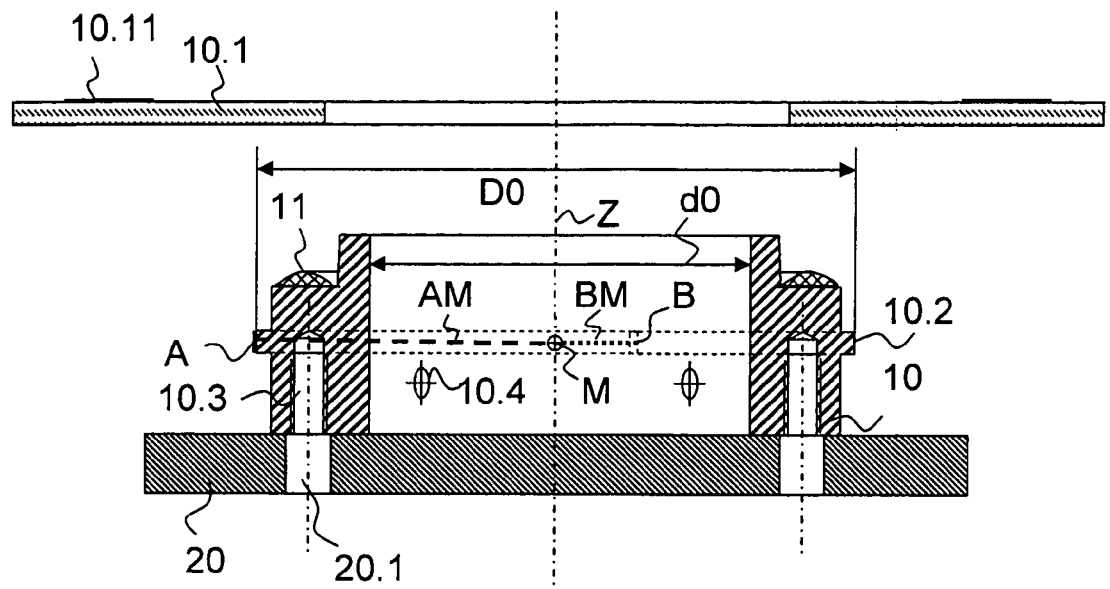
FIG. 4*a* is a cross-sectional view of a body together with a rotary table before an angle scaling is applied to it.
Figure 4B:
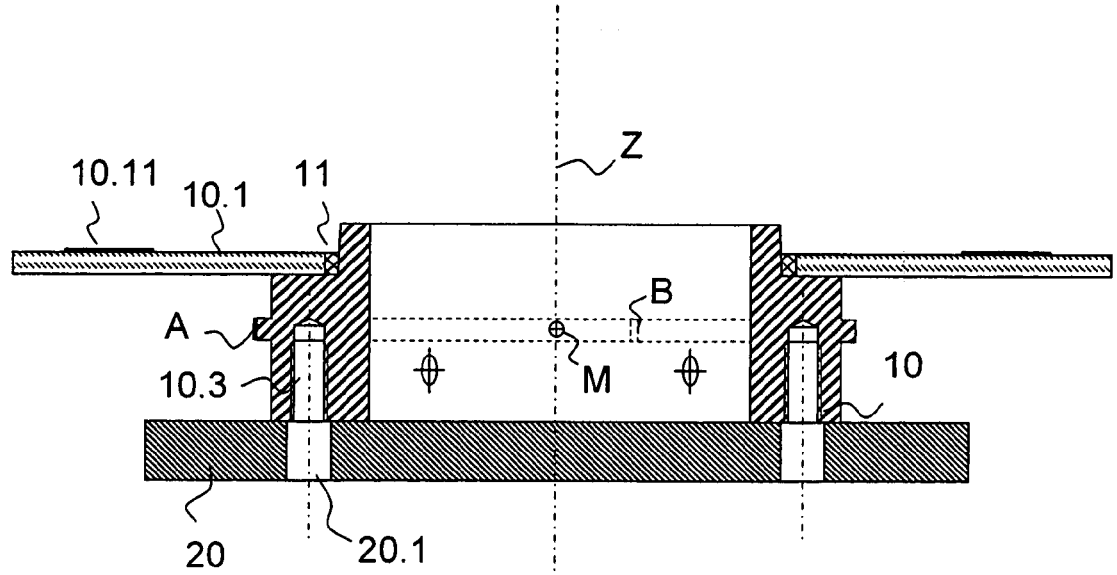
FIG. 4*b* is a cross-sectional view of a body together with a rotary table, having applied angle scaling.

Referring to FIGS. 4a and 4b, a body may be produced that is in the form of a ring-shaped hub 10. The ratio of outside diameter D0 to inside diameter d0 of hub 10 is D0/d0=205 mm/155 mm=1.3. Despite of the fact that hub 10 is produced comparatively precisely, it may inevitably have circularity deviations. Outside diameter D0 is determined at a circumferential shoulder of hub 10, the shoulder being limited in the radial direction by a lateral side 10.2.

In a further manufacturing step, hub 10 is clamped onto an air-supported rotary table 20, used as a support device, in a manner that a relative, radially directed shift of hub 10 relative to rotary table 20 is still possible. For this purpose, screws are accordingly turned through holes 20.1 in rotary table 20 into threaded holes 10.3 of hub 10. In this context, holes 20.1 have a somewhat larger inside diameter than the outside diameter of the screws, so that a slight shift of hub 10 is possible. On lateral side 10.2 of hub 10, three markings A, B, C are applied, each offset by 120°. Because of the cross-sectional view, marking C is not visible in FIGS. 4a and 4b. Marking B is located on lateral side 10.2 at the periphery of hub 10, and is therefore not directly visible in FIGS. 4a and 4b. Accordingly, marking B is represented with a dashed line.

Hub 10 is thereupon adjusted relative to rotary table 20. This adjustment is performed analogously to the exemplary embodiment further described above. The basic representation illustrated in FIG. 2 may thus also be viewed as a cross-section through hub 10 in the region of the shoulder at which markings A, B, C are applied. Hub 10 is thus shifted relative to rotary table 20 until distances AM, BM, CM between markings A, B, C and point M, which is permanent relative to rotary table 20, are equal. Point M then is located on axis of rotation Z of rotary table 20. Point M is located in the plane in which the points of the three markings A, B, C are also located. Adjusted hub 10 may then be immovably fixed in position relative to rotary table 20 by tightening the screws.

In the next step, an angle scaling 10.1 is applied to hub 10 which is adjusted relative to rotary table 20. In contrast to the exemplary embodiment described above, in this exemplary embodiment, a mark graduation is not written directly onto hub 10. Rather, an annular disk, which is already provided with graduation marks 10.11, is placed as angle scaling 10.1 onto hub 10. In this context, graduation marks 10.11 are marks that are radially aligned with respect to the annular disk, the annular disk itself being made here of glass. Before angle scaling 10.1 thus configured is placed onto hub 10, an adhesive 11 is applied to the corresponding contact surface on hub 10. This adhesive 11 may have the property that it is hardenable using UV light. Angle scaling 10.1 is centered relative to point M, i.e., axis of rotation Z of rotary table 20. As soon as the centered position (relative to point M) of angle scaling 10.1 is arranged, adhesive 11 may be hardened by UV irradiation.

Hub 10 provided with angle scaling 10.1 is thereupon dismounted from rotary table 20.

Thereafter, hub 10 provided with angle scaling 10.1 is then mounted at the location of the user of the angle-measurement system. The mounting is performed analogously as in the exemplary embodiment described above.

Thus, hub 10 is attached to a machine part, e.g., a shaft, so that the distances between markings A, B, C and a point on the axis of rotation of the machine part, which is permanent relative to the machine part, i.e., the shaft, are equal. In this context, for the radial adjustment, inside diameter d0 is somewhat larger than the diameter of the shaft whose rotational position is ultimately to be determined by the angle-measurement system. Screws, which facilitate the radial adjustment in the sense of equal distances between markings A, B, C and a point on the shaft, may be screwed into radial threaded holes 10.4 in hub 10. In this manner, simple production and mounting of a hub 10 having an angle scaling 10.1 may thus be possible.

What is claimed is:

1. A method for producing and mounting a body having an angle scaling, comprising:
    applying at least three markings on the body, the markings set apart from each other in a circumferential direction of the body;
    adjusting the body relative to a support device so that distances between the markings and a point, which is permanent relative to the support device and which is located on an axis of rotation of the support device, are equal;
    applying an angle scaling to the body after the adjusting step;
    after the angle scaling applying step, dismounting the body, provided with the angle scaling, from the support device; and
    mounting the body, provided with the angle scaling, on a machine part so that distances between the markings and a point, which is permanent relative to the machine part and which is located on an axis of rotation of the machine part, are equal.

2. The method according to claim 1, wherein the angle scaling is applied in the angle scaling applying step by an ablation process.

3. The method according to claim 1, wherein the markings are applied in the markings applying step by an ablation process.

4. The method according to claim 1, wherein the markings are applied in the markings applying step by a laser ablation process.

5. The method according to claim 1, further comprising coating the body at least in a region of the angle scaling after the angle scaling applying step.

6. The method according to claim 1, further comprising coating the body at least in a region of the markings after the markings applying step.

7. The method according to claim 1, further comprising coating the body with an ablation layer at least in a region of the markings after the markings applying step.

8. The method according to claim 1, wherein the markings include three markings arranged offset from each other by 120° in the circumferential direction of the body.

9. The method according to claim 1, wherein the body has a ring shape.

10. The method according to claim 9, wherein a ratio of an outside diameter of the body to an inside diameter of the body is less than 5.

11. The method according to claim 1, wherein the angle scaling is applied in the angle scaling applying step on a lateral side of the body.

12. The method according to claim 11, wherein the body has a circularity deviation in a region of the angle scaling less than 100 μm.

13. The method according to claim 11, wherein the body has a circularity deviation in a region of the angle scaling less than 50 μm.

14. The method according to claim 1, wherein the angle scaling is applied in the angle scaling applying step by a laser ablation process.

15. The method according to claim 1, wherein the angle scaling is applied in the angle scaling applying step by lithography.

16. The method according to claim 1, wherein the markings are applied in the markings applying step by lithography.

* * * * *